(12) United States Patent
Naibo et al.

(10) Patent No.: US 10,459,932 B2
(45) Date of Patent: Oct. 29, 2019

(54) VISUALIZING LARGE DATA VOLUMES UTILIZING INITIAL SAMPLING AND MULTI-STAGE CALCULATIONS

(71) Applicants: Alexis Naibo, Levallois Perret (FR); Xiaohui Xu, Courbevoie (FR); Yann Le Biannic, Suresnes (FR)

(72) Inventors: Alexis Naibo, Levallois Perret (FR); Xiaohui Xu, Courbevoie (FR); Yann Le Biannic, Suresnes (FR)

(73) Assignee: Business Objects Software Ltd, Dublin (IE)

( * ) Notice: Subject to any disclaimer, the term of this patent is extended or adjusted under 35 U.S.C. 154(b) by 827 days.

(21) Appl. No.: 14/575,633

(22) Filed: Dec. 18, 2014

(65) Prior Publication Data

US 2016/0179852 A1    Jun. 23, 2016

(51) Int. Cl.
*G06F 16/00*    (2019.01)
*G06F 16/2458*    (2019.01)
(Continued)

(52) U.S. Cl.
CPC ...... *G06F 16/2462* (2019.01); *G06F 16/2458* (2019.01); *G06F 16/2465* (2019.01); *G06F 16/26* (2019.01); *G06F 16/9038* (2019.01); *G06F 16/217* (2019.01); *G06F 16/23* (2019.01); *G06F 16/338* (2019.01); *G06F 16/34* (2019.01)

(58) Field of Classification Search
None
See application file for complete search history.

(56) References Cited

U.S. PATENT DOCUMENTS

| | | | |
|---|---|---|---|
| 5,555,403 A | 9/1996 | Cambot et al. | |
| 2006/0053103 A1* | 3/2006 | Chaudhuri | G06F 16/2462 |

(Continued)

OTHER PUBLICATIONS

Mankala, Chandrasekhar. SAP HANA Cookbook. Packt Publishing Ltd, 2013. (Year: 2013).*

(Continued)

*Primary Examiner* — Mark D Featherstone
*Assistant Examiner* — Diedra McQuitery
(74) *Attorney, Agent, or Firm* — Fountainhead Law Group P.C.

(57) ABSTRACT

Embodiments visualize large data volumes utilizing initial sampling to reduce size of a dataset. This sampling may be random in nature. The sampled dataset may be refined (wrangled) by binning, grouping, cleansing, and/or other techniques to produce a wrangled sample dataset. A user defines useful end visualization(s) by inputting expected dimension/measures. From these visualizations of sampled data, minimal grouping sets are deduced for application to the full dataset. The user publishes/schedules the wrangled operation and grouping sets definition. Based on this, a wrangled dataset and grouping sets are produced in the big data layer. When the user accesses the visualization(s), minimal grouping sets are retrieved in the in-memory engine of the client and processed by an in-memory database engine according to the common processing plan. This produces result sets and a final set of visualizations of the full dataset, in which the user can recognize valuable data trends and/or relationships.

11 Claims, 15 Drawing Sheets

(51) Int. Cl.
*G06F 16/26* (2019.01)
*G06F 16/9038* (2019.01)
*G06F 16/21* (2019.01)
*G06F 16/23* (2019.01)
*G06F 16/338* (2019.01)
*G06F 16/34* (2019.01)

(56) References Cited

U.S. PATENT DOCUMENTS

| | | |
|---|---|---|
| 2008/0306903 A1* | 12/2008 | Larson .............. G06F 17/30536 |
| 2009/0018935 A1 | 1/2009 | Neumaier et al. |
| 2009/0328175 A1 | 12/2009 | Shuster |
| 2014/0156806 A1* | 6/2014 | Karpistsenko .......... G06F 16/25 709/219 |
| 2014/0280042 A1* | 9/2014 | Lock .................... G06F 16/248 707/722 |
| 2014/0351233 A1* | 11/2014 | Crupi ............... G06F 16/24568 707/706 |
| 2016/0078361 A1* | 3/2016 | Brueckner ............. H04L 67/10 706/12 |

OTHER PUBLICATIONS

Extended European Search Report for EP Application 15003481.7 dated Apr. 22, 2016, 8 pages.

* cited by examiner

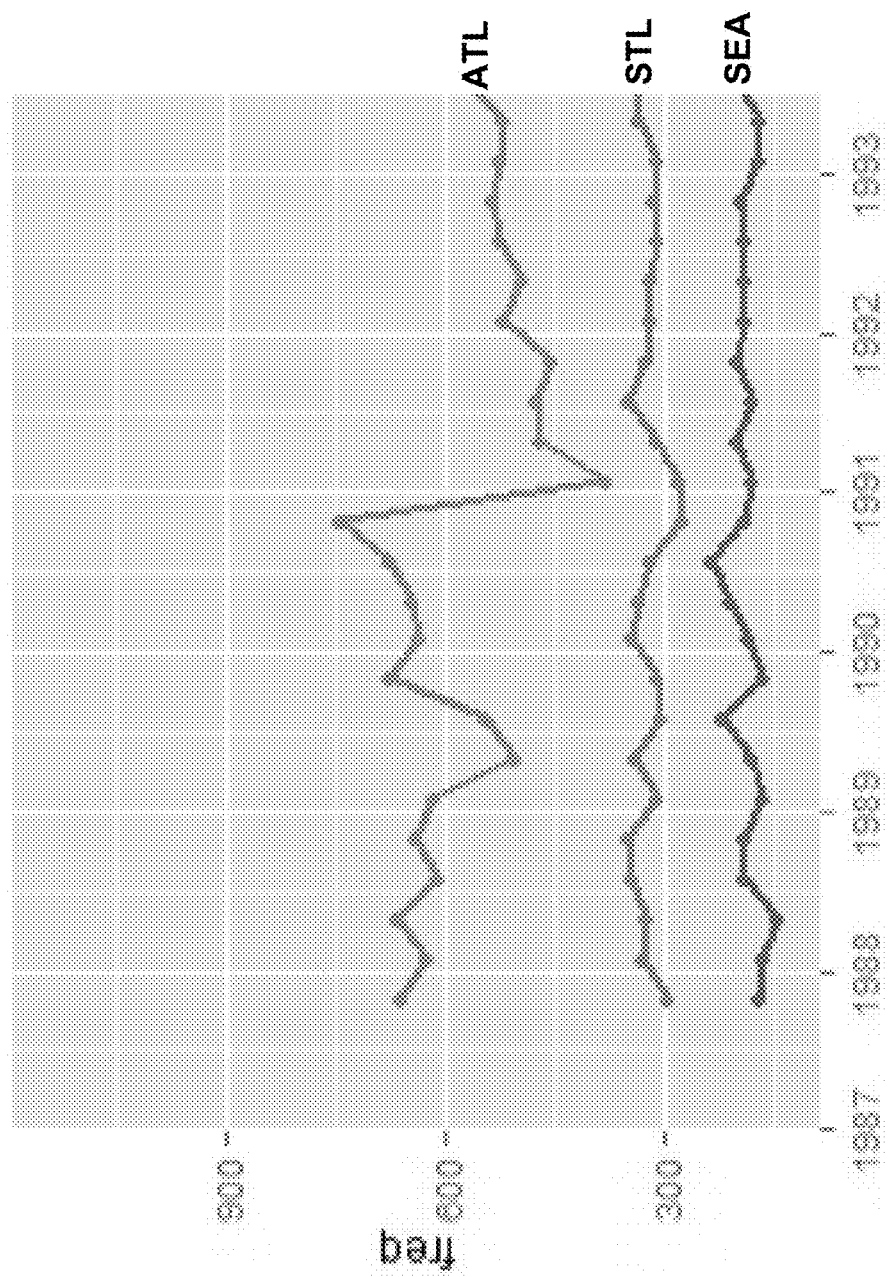
FIG. 3D1

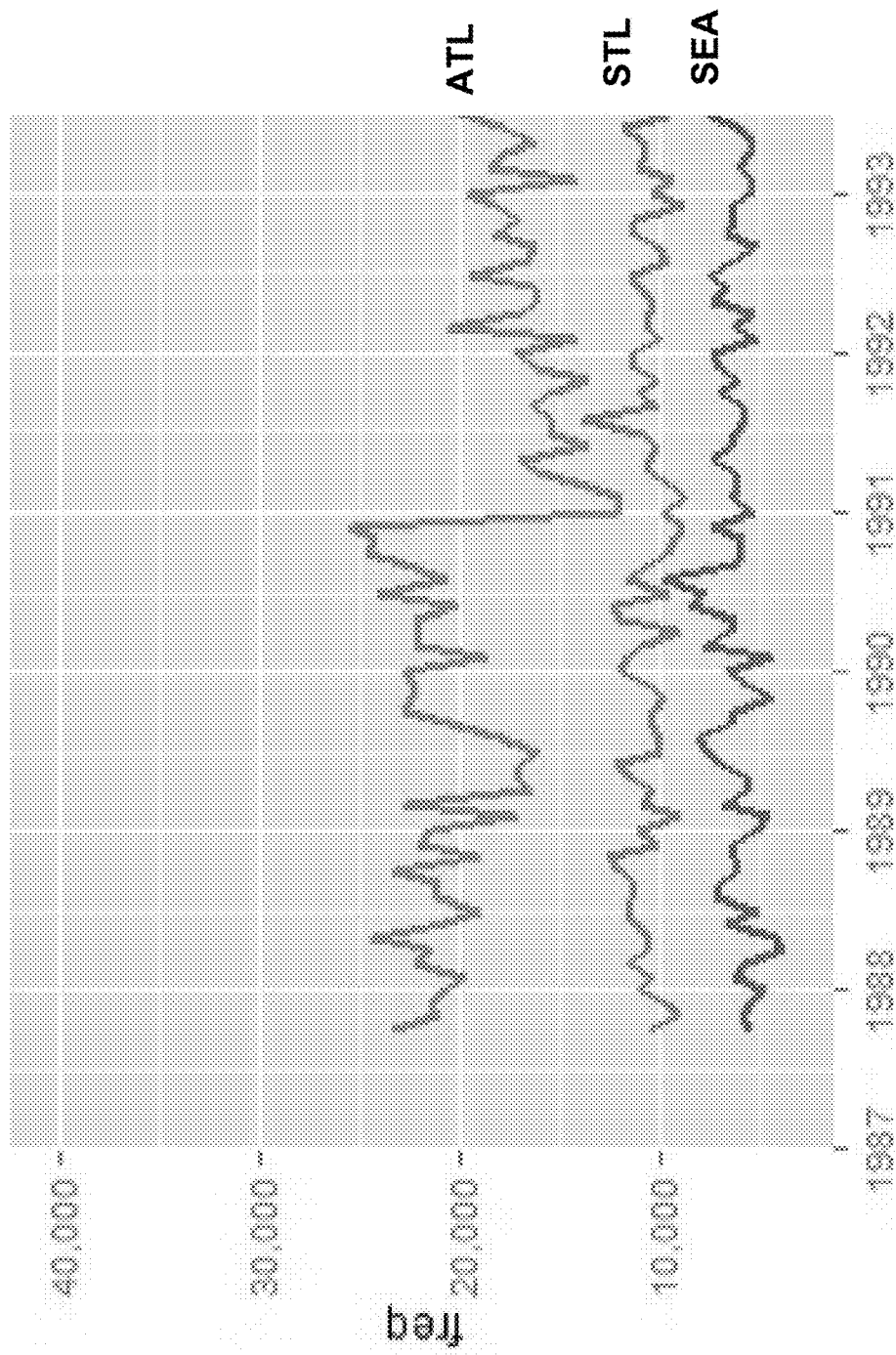
FIG. 3D2

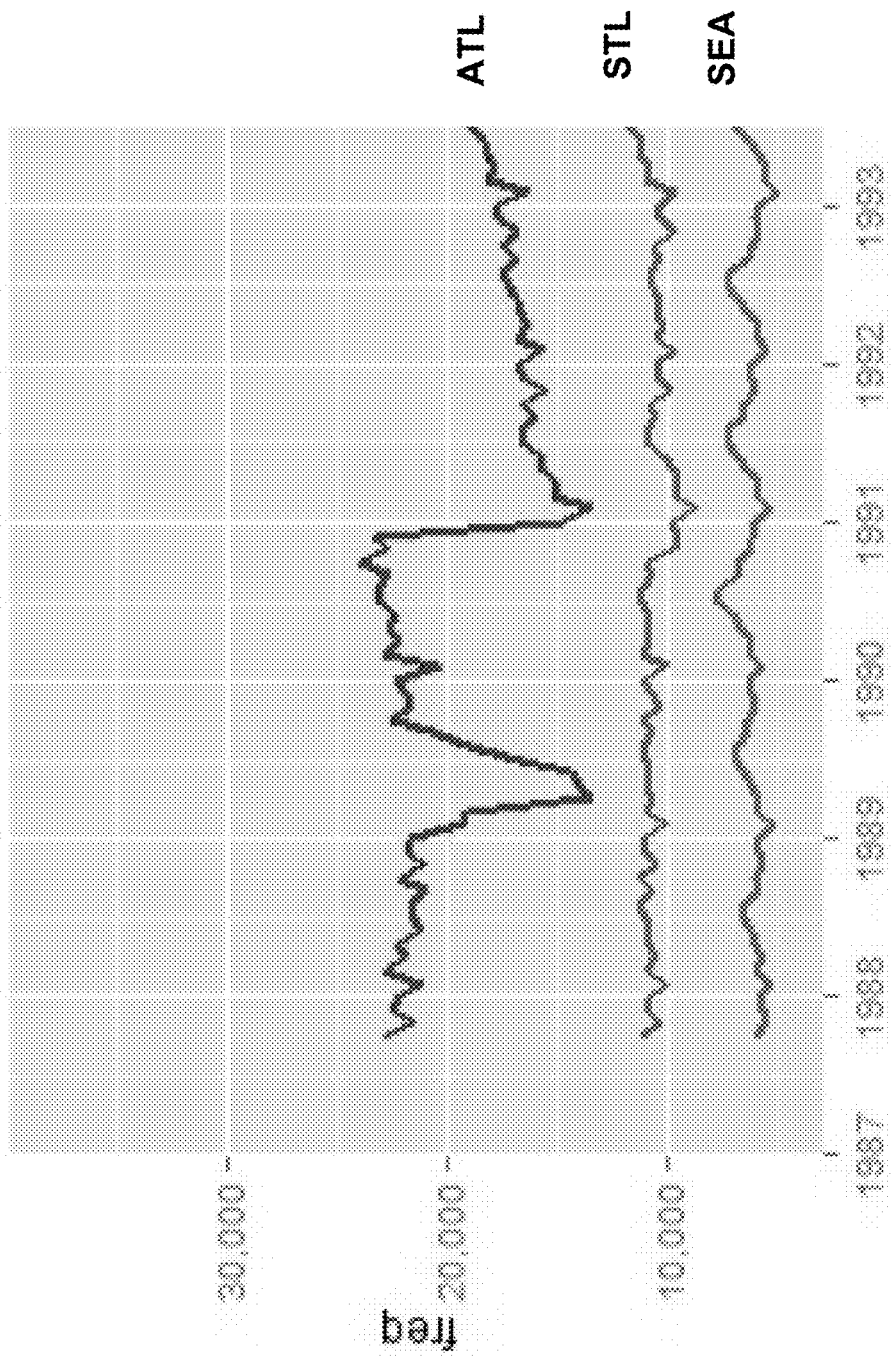
FIG. 3G1

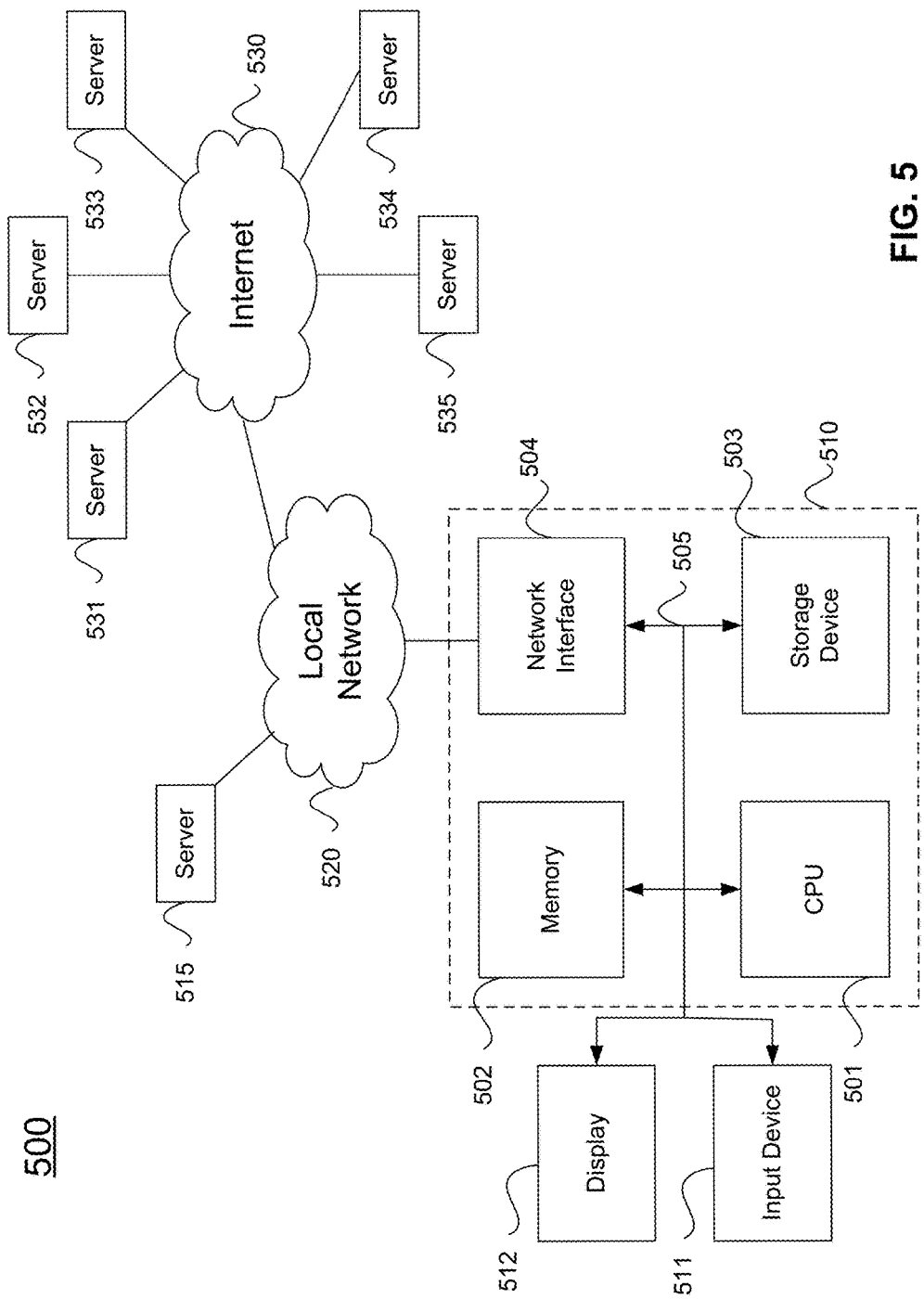

VISUALIZING LARGE DATA VOLUMES UTILIZING INITIAL SAMPLING AND MULTI-STAGE CALCULATIONS

BACKGROUND

The present invention relates to analysis of large data volumes, and in particular, to systems and methods for visualizing large data volumes utilizing an initial sampling and a multi-stage calculation.

Unless otherwise indicated herein, the approaches described in this section are not prior art to the claims in this application and are not admitted to be prior art by inclusion in this section.

With the evolution in sophistication and complexity of databases, stored data is available for visualization and analysis in increasingly large volumes. Such "big data" may comprise millions or even billions of different records.

In order to assimilate such large amounts of data, big data platforms generally sacrifice the ability to perform complex analytical functions. Instead, their query expressivity functionality may be limited to relatively simple operations. These functions may not afford a user with valuable insight into trends and other relationships that are masked beneath the sheer volume of available data.

Apart from exhibiting limited querying capability, conventional big data platforms may also suffer from slow querying. Specifically, many potential applications call for a user to engage in interactive querying in order to produce desired visualization with the data. This typically involves the user creating and changing visualizations of the data multiple times, in an iterative manner.

Effectively performing interactive visualization, however, generally requires a response time on the order of seconds (e.g., 1-5 seconds). However, conventional big data platforms generally operate too slowly to allow this type of interactive visualization activity.

SUMMARY

Embodiments relate to systems and methods of visualizing large data volumes utilizing sampling techniques and the formulation and application of multi-stage calculation plan(s). A big data volume is initially sampled to reduce its size. This sampling may be random in nature. The sampled dataset may be further refined (wrangled) by discretization that may include rounding, binning, and/or characterization etc. to produce a wrangled sample dataset. A user defines useful end visualization(s) by inputting expected dimension/measures, thereby creating a calculation plan having multiple stages. From these visualizations of sampled data and the calculation plan derived therefrom, minimal grouping sets are deduced for application to the full dataset. The user publishes/schedules the wrangled operation and grouping set extraction definition. Based on this, a wrangled dataset and grouping sets are produced in the big data layer. When the user displays the visualization(s), minimal grouping sets are retrieved in the in-memory engine of the client and processed by an in-memory database engine according to the common calculation plan. This produces result sets and a final set of visualizations of the full dataset, in which the user can recognize valuable data trends and/or relationships.

The following detailed description and accompanying drawings provide a better understanding of the nature and advantages of the present invention.

BRIEF DESCRIPTION OF THE DRAWINGS

FIG. 5 illustrates an example of a computer system.

DETAILED DESCRIPTION

Described herein are techniques for visualizing large data volumes utilizing sampling techniques. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
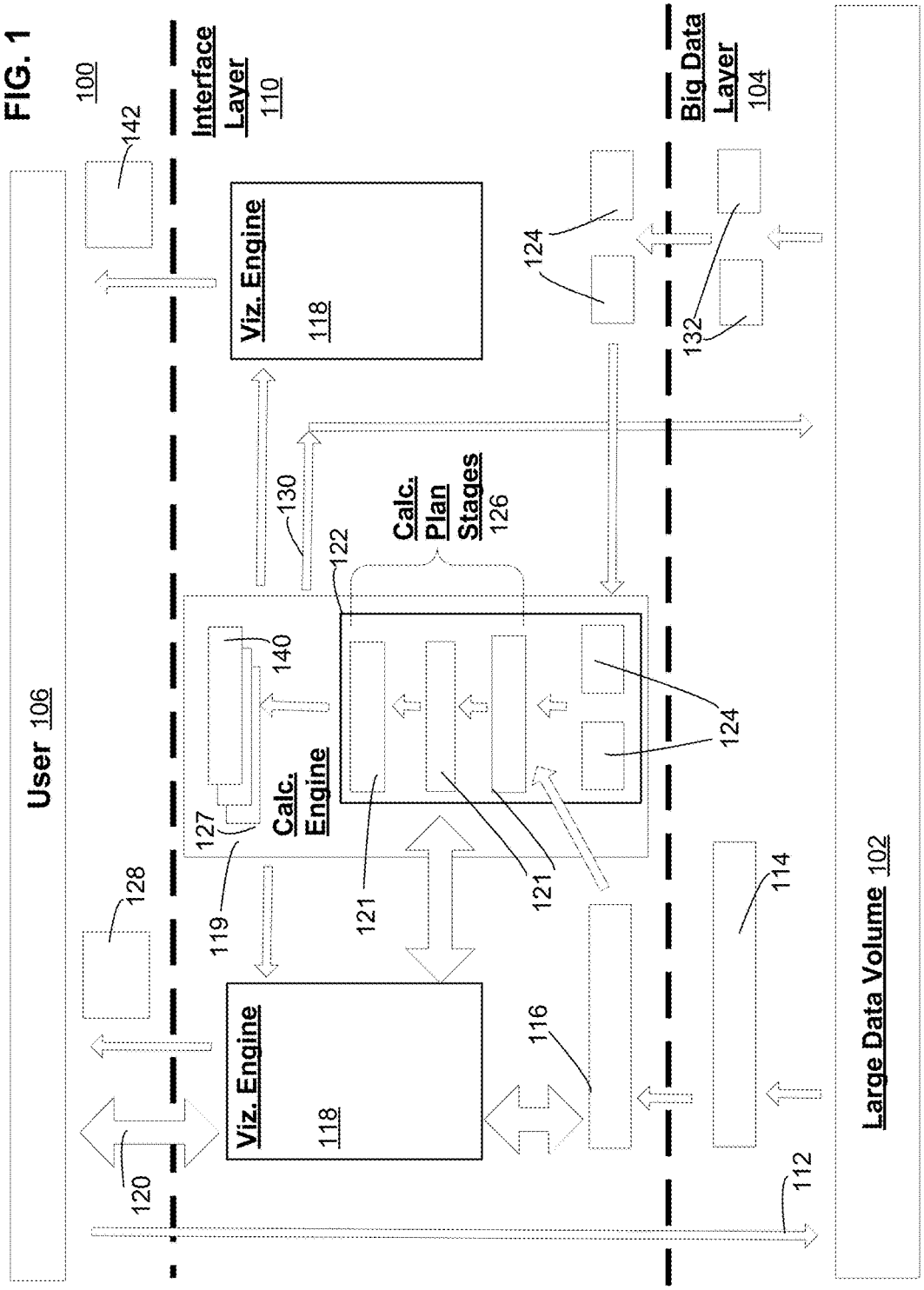
FIG. 1 illustrates a simplified view of a system configured to perform visualization of large data volumes according to an embodiment.

FIG. 1 shows a simplified view of a system 100 according to an embodiment. Specifically, a large data volume 102 (e.g., comprising millions of records) is stored in an underlying big data layer 104. This large data volume typically comprises data stored according to tables/rowsets.

A user 106 seeks to access, manipulate, and visualize these large data volumes utilizing the analytical functionality provided by an interface layer 110, for example a Business Intelligence (BI) tool in communication with in-memory database layer. Such an in-memory database layer is configured to handle data volumes smaller than that offered by the big data layer.

Accordingly the user provides a first input 112 to the big data layer, to produce a sampled dataset 114 of a size able to be manipulated by the in-memory database.

This sampled dataset is then subject to additional refinement to produce a wrangled sample dataset 116. This wrangled sample may be transferred into and stored in an interface layer including an in-memory database.

Examples of techniques that can be used to perform refinement of the sampled data to produce the wrangled sample dataset, include but are not limited to discretization such as binning, grouping, categorization, and others. Further details regarding data refinement techniques are discussed in detail in connection with the example below.

Next, the user interacts with the wrangled sample dataset utilizing a visualization engine 118. In FIG. 1, the visualization engine 118 is shown in two parts for purposes of illustrating a temporal nature of interaction therewith, and this figure does not depict two separate visualization engines.

In particular, the user provides inputs 120 to the visualization engine, specifying those dimensions and measures of the underlying data that are expected to be of interest. This exploration of the sampled data is also referred to herein as storytelling. This storytelling reflects effort by the user to create one or more data visualizations in a manner giving rise to meaningful insight into trends and relationships present within the data.

Based upon the particular visualizations of the sampled data deemed useful by the user, a calculation plan 122 is created. Specifically, the calculation plan comprises manipulating the data of minimal grouping sets 124 over multiple stages 126. Each of these stages typically comprises execution of operations in the Structured Query Language (SQL) or other relational query language.

FIG. 1 shows the execution of the calculation plan by a calculation engine 119. This calculation engine may comprise an in-memory database engine.

Each calculation node 121 of the calculation plan consumes one or multiple rowsets, and produces a rowset. Depending on the technology used, some intermediate nodes may be temporarily materialized.

The multiple stages of the calculation plan culminate in final result sets 127. Utilizing the visualization engine, these final result sets may be iterated to create corresponding visualization(s) 128 of the data for the user. These visualizations can define elements such as axis members, point coordinates, cell values, bubble sizes, etc.

Again, using the visualization engine, a user may generate and revise the calculation plan on the basis of components (e.g., dimensions, measures) and/or regions (e.g., timeframes, intervals, ranges) of the sampled dataset expected to yield insights.

The minimal grouping sets comprising the input to this calculation plan, are deduced from the end visualizations by the calculation plan. That is, with the assistance of the visualization engine, a user may move backward through the multiple stages relied upon to calculate the end visualizations, to identify a minimal set of data needed—the minimal grouping set.

The end visualizations are provided by the interface layer to the user. Next, input 130 comprising a grouping set extracting definition is provided to the big data layer to generate minimal grouping sets.

Various aspects of the process flow just described for generating minimal grouping sets, are now further illustrated in connection with one particular example. Specifically, a minimal grouping applies a filter and an aggregation on a source table, and produces a new table smaller than the source table.

Each grouping set is substituted to the source table in the calculation plan, for one or many input nodes. The grouping sets are determined so that an input node produces the same results, whether it operates on the source table or on its substituted grouping set.

Thus, a particular calculation plan may involve the following three (3) input nodes N0, N1, N2 (using SQL as a query language) on a source table <source table>.
N0:
SELECT SUM(Revenue), Country, ProductFamily
FROM <source table>
WHERE Country IN ('USA')
GROUP BY Country, ProductFamily
N1:
SELECT SUM(Revenue), Country, ProductFamily
FROM <source table>
WHERE Country IN ('UK', 'Germany')
GROUP BY Country, ProductFamily
N2:
SELECT SUM(Revenue), ProductFamily
FROM <source table>
WHERE Country IN ('USA', 'UK') AND ProductFamily IN ('Fruit juice', 'Soda')
GROUP BY ProductFamily Analyzing the input nodes would lead to the definition of a single minimal grouping
set GS1:
SELECT SUM(Revenue), Country, ProductFamily
FROM <source table>
WHERE Country IN ('USA', 'UK', 'Germany')
GROUP BY Country, ProductFamily In this example, all input nodes can be computed by substituting the results of GS1 to the source table. All source tuples that match the filter condition for N0, N1 or N2 also match the filter condition for GS1 (so the source tuples to compute the input nodes are included in the source tuples to compute GS1). All columns used by the filter condition for N0, N1 and N2 are available in GS1.

Revenue is aggregated with an additive function, allowing aggregation of Revenue on two columns (ProductFamily and Country) and then re-aggregation on a single column (ProductFamily). This allows the same results to be obtained as by aggregating directly Revenue on ProductFamily.

No other grouping set can contain fewer rows than GS1 and still be used as a source to produce N0, N1 and N2. This reflects the minimal property of the minimal grouping set.

The SQL query for GS1 is pushed to the big data layer. Its result set will be transferred from the big data layer to the local engine, as a new table <GS table>. The definition of N0, N1 and N2 in the calculation plan can be modified to use <GS table> instead of <source table>.

Returning now to FIG. 1, the grouping set extracting definition allows the big data layer to create a wrangled dataset 132 from the large data volume. This wrangled dataset reflects data manipulation and/or refinements that reduce its size and improve its effectiveness for processing.

A variety of techniques may be used to create the wrangled dataset 132 from the large data volume based on the minimal grouping set definition. Such techniques may include but are not limited to binning and/or grouping. The wrangled dataset may be materialized in the big data layer as a specific table, or may remain in virtual form.

Thus, based upon the insights afforded by earlier review of the visualizations and creation of the calculation plan, the minimal grouping sets 124 are generated from the wrangled dataset. These minimal grouping sets match the expected input nodes of the calculation plan.

An initial calculation filter may be designed to produce minimal grouping sets from the wrangled dataset. Filters are pushed down to the wrangled dataset such that the grouping set contains only dimensions and measures to be aggregated together for at least one visualization block. The minimal grouping sets are deduced from what the end-used defines: visualizations involving prepared dimensions and measures.

The minimal grouping sets are transferred to the layer including the in-memory database. There, they may be stored (e.g., by the in-memory database) and accessed by the engine to perform calculations according to the calculation plan. This calculation plan transforms the pre-filtered and pre-aggregated data of the minimal grouping sets into final result sets 140 that will be iterated to "draw" the end visualizations 142 (axis members, point coordinates, cell values, bubble sizes, etc . . . ). Each calculation node consumes one or multiple rowsets, and produces a rowset. Depending on the technology used, some intermediate nodes may be temporarily materialized.

Review of the final visualizations provides some insight regarding the larger dataset to the user. This insight may in turn be relied upon by the user to take further actions. Example of such further actions can include taking a new sampling to begin the process again, and/or changing the calculation plan to perform different calculations on an existing sample.

Particular embodiments may leverage the processing power of an in-memory database architecture to perform the data analytics. For example, the engine may be an engine of an existing in-memory database, such as the HANA in-memory database available from SAP SE of Walldorf, Germany.

However, other in-memory database architectures are known. Examples include but are not limited to, the SYBASE IQ database also available from SAP SE; the Microsoft Embedded SQL for C (ESQL/C) database available from Microsoft Corp. of Redmond, Wash.; and the Exalytics In-Memory database available from Oracle Corp. of Redwood Shores, Calif.

Figure 2:
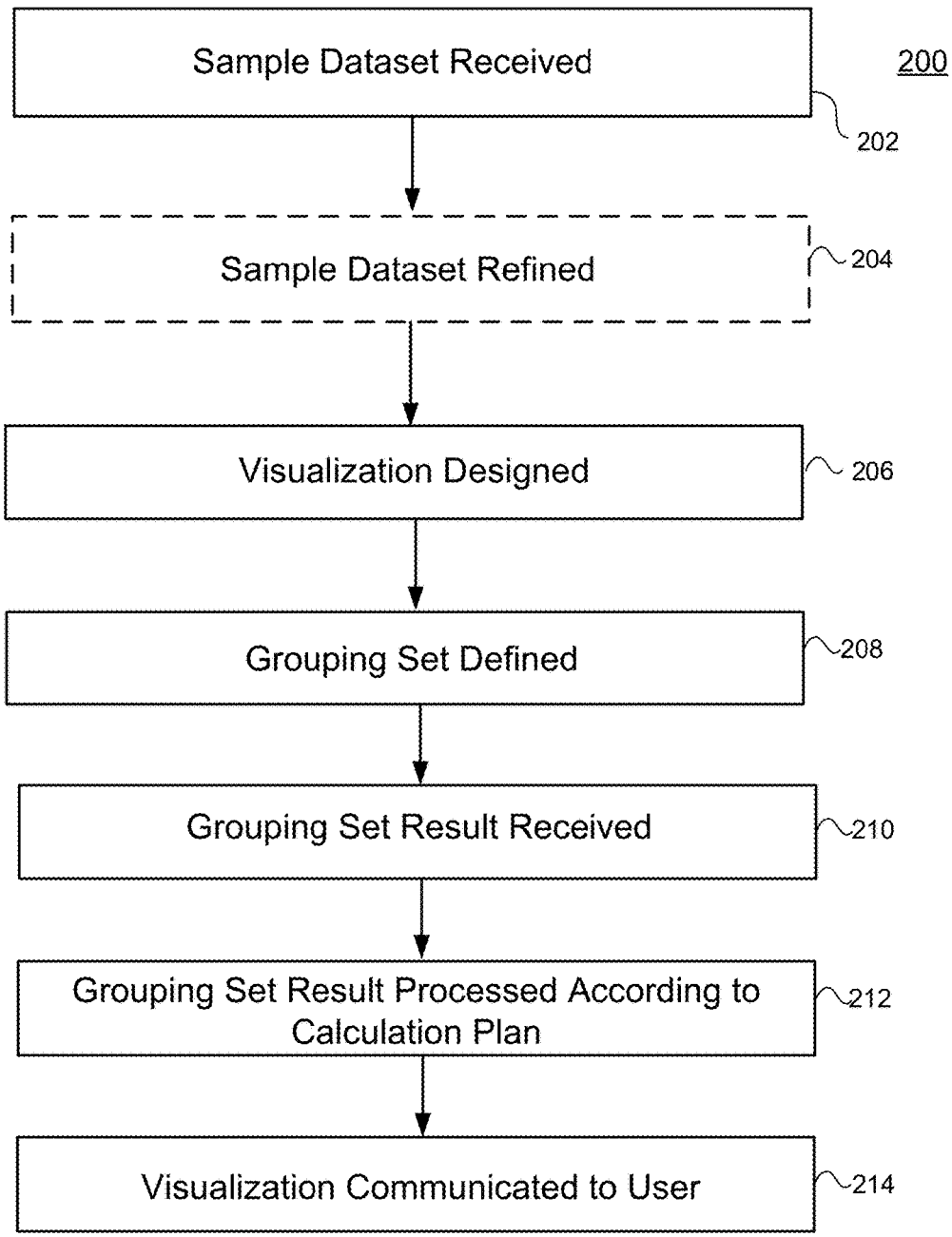
FIG. 2 illustrates a simplified diagram of a process flow according to an embodiment.

FIG. 2 shows a simplified diagram illustrating a process flow 200 according to an embodiment. In a first step 202, an interface layer receives a sampled dataset from a big data layer.

In an optional second step 204, the sampled dataset may be refined by the application of one or more techniques.

In a third step 206, a visualization engine of the interface layer designs end visualization(s) that provide insight into the sampled dataset.

In a fourth step 208, the visualization engine generates a calculation plan comprising multiple stages that culminate in these end visualizations. Minimal grouping sets are defined in the calculation plan. These minimal grouping sets are deduced from the calculation plan.

In a fifth step 210, the grouping set results are received from the sample dataset. These grouping set results may reflect refinement/wrangling of the data.

In a sixth step 212, the grouping set is processed by an in-Memory engine according to the calculation plan. In a seventh step 214, a first visualization is communicated to the user.

Embodiments are now described in connection with an example of the visualization and analysis of a large data volume from the HADOOP big data platform, which is available from the APACHE SOFTWARE FOUNDATION. The visualization/analysis is performed based upon multi-stage calculations of a calculation plan formulated utilizing a visualization engine of a Business Intelligence (BI) tool, executed by a HANA in-memory calculation engine embedded in a LUMIRA interface layer available from SAP SE, of Walldorf, Germany.

EXAMPLE

Figure 3A:
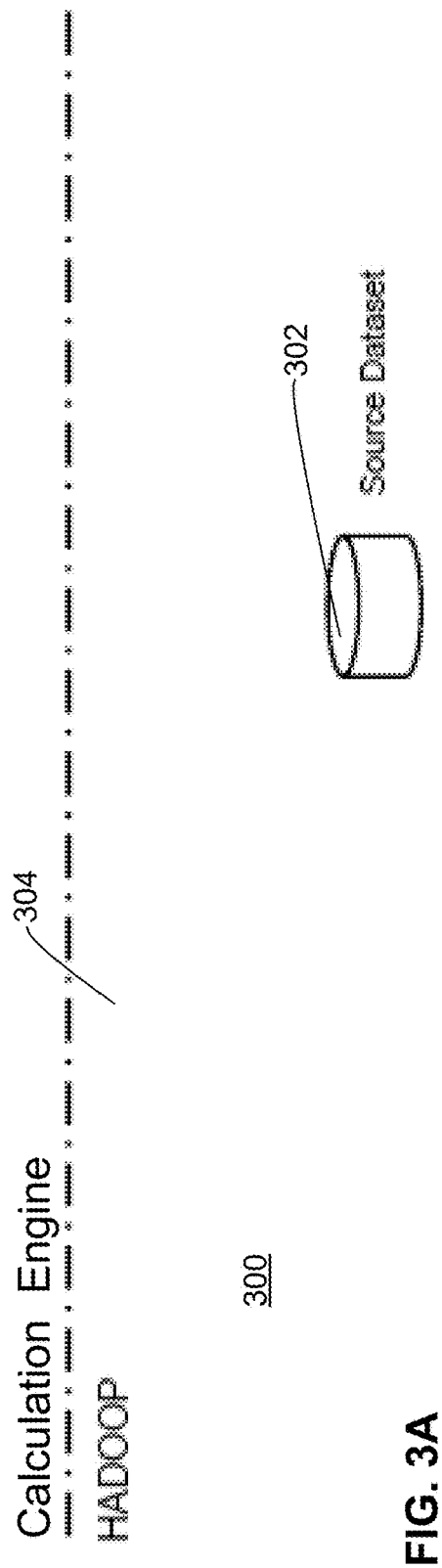
FIGS. 3A-3H illustrate various steps in a specific example.

FIG. 3A shows the initial stage 300, where source dataset 302 resides in the big data layer 304 of the HADOOP platform. This source dataset may be extremely large, comprising for example on the order of at least millions of records. In this particular example, the data comprises all national flights in the USA over a decade, for three different busy destination airports: Atlanta (ATL), Seattle (SEA), and St. Louis (STL).

The HADOOP platform may afford a user with some basic functionality for interrogating and manipulating this large volume of data. Examples of such functionality can include filter and aggregation operations.

However, the HADOOP big data platform may be unable to provide a user with functionality necessary to perform more detailed analysis of the large data volumes involved. Such functionality is described in detail in the following SQL standards—SQL:99, SQL:2003, and SQL:2011, each of which is incorporated by reference herein for all purposes. For example, HADOOP may not support one or more of the following SQL operators commonly used for data analysis and manipulation: •Union, •Intersection, •Minus, •Rownum, •Rank, •Running Aggr, •Moving Aggr.

Accordingly embodiments may utilize an initial sampling of the big dataset of HADOOP, in order to create a dataset of a reduced size that is amenable to handling by an in-memory database engine (e.g., the calculation engine of the LUMIRA interface) offering such enhanced analysis/manipulation functionality. According to certain embodiments, the initial sampling may be random in nature.

Following refinements (e.g., data cleansing) further focusing its relevance, this smaller dataset produced by sampling, may be processed by a calculation engine of an in-memory database to develop a calculation plan affording a user with relevant visualizations.

Then, based upon insights provided by the visualizations of the sampled data, the user may return to query the original big data set to obtain minimal grouping sets therefrom. Processing those minimal grouping sets according to a calculation plan executed by the engine, may afford the user with enhanced visualizations of data of the big data set.

Figure 3B:
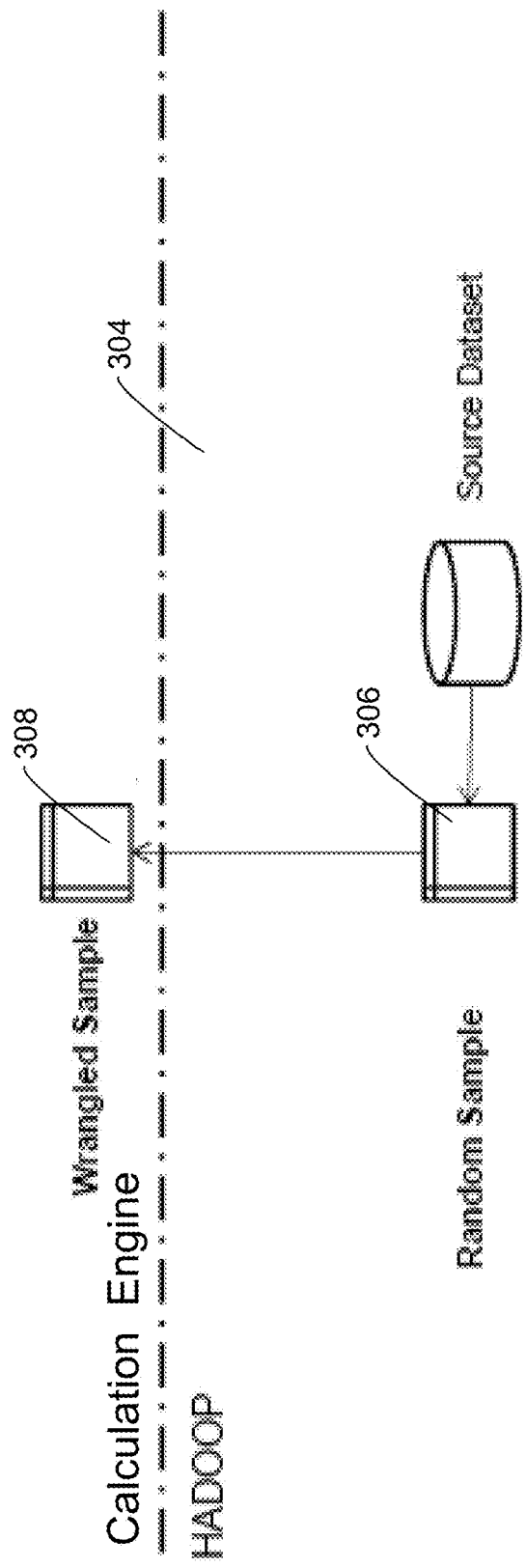

FIG. 3B thus shows the next stage, wherein a user accesses the big data layer 304 and utilizes functionality thereof to create a random sample 306 having particular characteristics. According to certain embodiments this random sample may not be persisted in HADOOP. Instead, it may be stored as a wrangled dataset accessible to the calculation engine, as is further discussed below.

According to one particular sample workflow, the user may enter HADOOP HIVE server connection parameters into the LUMIRA interface (the user may also be called upon to enter a credential). Upon the user clicking next, the HADOOP system proposes the list of HIVE schema as well as the corresponding HIVE tables for a chosen schema. The user selects one for each.

Next, the user gives a name to the dataset that will be generated. In certain embodiments, this dataset name can be according to the format: ["schema name"."table name".]

A user may next click on Add Table button to display the corresponding tableview. The system displays to the user a tableview comprising the dataset columns with the first twenty lines.

The user then selects for retrieval, only those specific table columns that are to be interacted with. The system shows the number of lines, columns, and cells that will be acquired from the dataset to understand the impact of its choices.

The calculation is performed based on select count(*) from the table. This operation may be executed efficiently by the existing HADOOP functionality.

Where the overall size of the dataset in HADOOP is greater than a certain amount (e.g., 50 million cells), the system may advise a user to leverage sampling as a basis for data visualization and analysis according to an embodiment. Thus, the user can select a number of lines for the sampling to be acquired. Optionally, the user may also select the column on which a sampling algorithm is to be run.

Details regarding elements for sample sizing are now discussed. Certain embodiments may focus upon COUNT and SUM aggregations.

For COUNT aggregations, computing counts on two significantly different distributions: a half-normal distribution and an exponential distribution are considered.

In the Business Intelligence (BI) world, the problem may be equivalent to counting the frequency of the members of a single dimension, and the frequency of tuples involving multiple dimensions.

For each of the two distributions, an empirical study has been done on three data sets (1M, 5M and 200M rows). From each data set, random samples have been extracted (200K rows, 500K and 1M rows), and the COUNT results compared on the samples vs the full data set. Counts on samples have been adjusted for the sampling ratio. This work indicated the relative error does not perceptibly depend on the value distribution being tested the error curves are similar for the three full data sizes. The relative error depends mostly on the sample size (not the sampling ratio) and the relative frequency of the value being counted. A 1M rows sample supports COUNT aggregations with an error below 10% for values which relative frequency is as low as 0.1%

For SUM aggregations, consider an aggregation of one variable against another discrete variable. In the BI world, this may correspond to aggregating a measure on a single dimension (the relative frequency will be the frequency of dimension members) or to aggregating a measure on multiple dimensions (the relative frequency will be the frequency of multidimensional tuples)

The distribution of the dimension variable is half-normal. Two distributions for the measure were tested: a normal distribution and a custom-built multimodal distribution.

It is observed that the relative error depends on the distribution of measure values (before aggregation). The error curves are similar for the three full data sizes for a given measure distribution, the relative error depends mostly on the sample size (not the sampling ratio) and the relative frequency of the dimension member being aggregated for the tested distributions. A 1M rows sample supports SUM aggregations with a relative error below 10%, for dimension members/tuples which relative frequency is as low as 0.7%.

Thus, assuming a 10% relative error (99% confidence interval) is acceptable for many BI tasks (e.g. comparative studies, trend analysis, etc.), then a 1 million rows sample may be a good starting point for a workflow on a HADOOP data source. On an enterprise network, a random sample this size could be collected in less than 10 minutes, and could then support several hours of data exploration, data analysis, and/or visualization design. Of course, a sample size of one million rows is not required, and as used here this figure merely represents a heuristic rather than a fixed number. The actual size of the sample may vary depending upon the particular application and embodiment.

Fetching the sample asynchronously could allow the end-user to start working as soon as a certain number of rows (e.g. 100K rows) have been collected, which should take less than a minute on an intranet. Large samples may be shared across multiple users. And, it is further noted that most eventually published visualizations will likely be computed offline (i.e. by a scheduled task), on the full available data.

The interface then acquires the sampled dataset and provides statistics to the user. At this point, a user may be advised that she is working with only a sampled dataset, rather than the entire dataset.

As further shown in FIG. 3B, utilizing the LUMIRA interface, the sampled dataset may next be subjected to certain processing for refinement. In particular, this data refining process may be referred to herein as data wrangling.

Specifically, a user may define one or more of the following in order to enhance the relevance of the sampled data for visualization and focus analysis thereon:
binning;
grouping;
categorization;
segmentation; and
pivoting.

Figure 3C:
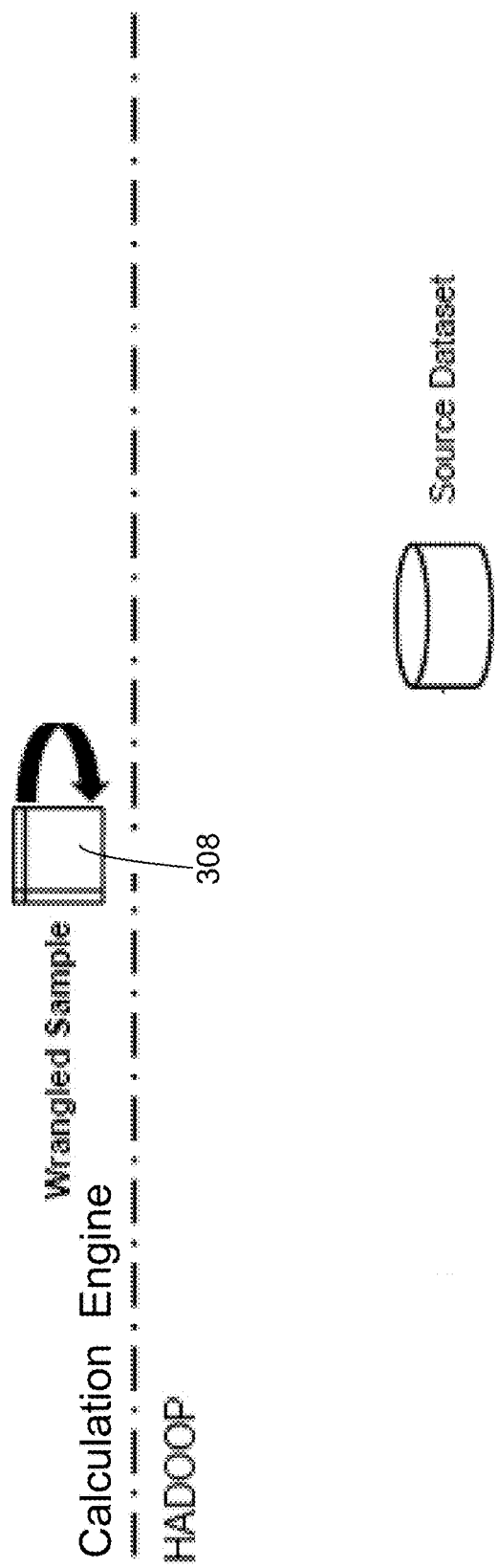

Details regarding various of these data manipulation types, are provided later below. In certain embodiments, this data manipulation may be implemented by the LUMIRA interface layer. Accordingly, FIG. 3B shows the wrangled sample 308 present within that layer. FIG. 3C shows processing of the wrangled sample within the interface layer.

These data manipulations may impart significant business meaning to the data. They may also reduce a size of the published dataset once aggregated, thereby enhancing an ability of the engine to perform analytical processing of the smaller data set in a reasonable period of time.

As mentioned above, a user may take actions in order to prepare a wrangled sample for processing by a calculation engine of the in-memory database layer. Examples of such action include server-side discretization, and the removal of columns At this stage, a user may perform further data cleansing in order to normalize the dimension of the sampled dataset. This may be done by removing spelling errors, blanks, duplications, etc.

Server-side discretization is now discussed. A continuous numeric attribute may not be suited for direct use as a dimension when aggregating data, because it holds too many distinct values and thus may interfere with the aggregation reducing the cardinality of the dataset. In the world of Big Data, such continuous values may come from sensors (e.g. temperature, velocity, acceleration) or position-tracking devices (e.g. GPS).

Server-side discretization may thus serve at least two goals. One is to map a large set of source values into a manageable smaller set of dimension members, in order to reduce the volume of data that needs to be transferred to the client (e.g., from HADOOP to the calculation engine of LUMIRA). Another goal is to transfer continuous attributes into discrete values which are more adapted for LUMIRA desktop visualization.

Rounding is the simplest form of discretization. This may involve reducing the number of unique values by reducing the number of significant digits.

Where an interval between the minimum and maximum values is small (e.g. from −40 to 50 for a temperature measured in degrees Celsius), basic rounding may be enough to discretize a column, using any equivalent of the ROUND( )function available in the HANA in-memory database available from SAP SE of Walldorf, Germany.

Small values can be discretized by applying ROUND (value, n) where n is the number of places after the decimal point. Large values with a small max/min ratio may be rounded to their higher significant digits with a formula such as ROUND(value/POWER(10, d))*POWER(10, d).

Rounding to the closest round figure is acceptable for most cases, except when round figures have a special business meaning and act as a kind of threshold. For instance, the weight of diamonds is measured in carats, and pricing is defined using weight segments such as 1.00-1.49 carats.

Under these circumstances, belonging to a given segment has a strong impact on pricing. A 1.04 carat diamond will be priced as a 1.00 carat stone, but a 0.96 carat diamond will likely be priced as a 0.9 carat stone. In such special cases, it may be better to round down to the smaller round figure (using the equivalent of the HANA ROUND_DOWN option).

Where the ratio between the maximum and minimum values is important (e.g.

prices ranging from $100 to $1,000,000), basic rounding may not offer the best way to reduce the number of unique values. This is because it may produce too many large values (e.g. 999997, 999998, 999999), or accuracy is lost for small values (e.g. 100, 200, 300, . . . , 999900).

A solution is to round a value x to its d most significant digits, with a formula such as:

$$y=POWER(10, FLOOR(LOG10(x)))$$

$$c=POWER(10, d-1)$$

$$result=ROUND(x*c/y)*y/c, \text{ or alternately}$$
$$result=ROUND(x/y, d-1)*y$$

From an end-user perspective, such a formula should be provided as a predefined function. One example is as follows:

signif(<value>, <digits>) to round<value>to its first<digits>significant digits.

Currently, rounding is supported by LUMIRA through the creation of a calculated dimension. For a large range of values, a helper or a predefined function may create a calculated dimension by just specifying the expected number of significant digits (to avoid having to create a formula involving Log10 and Round).

Binning is an alternate way of mapping a large set of values into a smaller set of intervals. In binning, however, the interval boundaries are not defined as round figures. Rather, the number of discrete values/intervals is fixed A general binning algorithm is to:
i. compute a measure M for each input value;
ii. compute the min and max for M;
iii. split the interval min-max into a given number of bins; and
iv. map each input value to its bin.
The mapping may be done using either the bin index or a value representative of the bin (such as its min, max or median value).

Bins may be of equal-width. This is a most common usage of binning, where the measure M is the input value itself, and the data after binning is directly suitable to be displayed as a histogram.

When the ratio between the maximum and minimum value is high (e.g., from 200 to 1,000,000), a variant may use a logarithmic scale (i.e. M=log(value)).

Equal-width bins may not be adapted for data that is grouped into irregular intervals (e.g. a multimodal distribution with large gaps). Under such conditions, one option is to create bins containing about the same number of data points, which is a way to obtain equal-probability bins. A practical way of achieving this is to compute the rank of the input value (e.g. according to its ascending order), and to use the value rank as the binning measure.

LUMIRA supports fixed-width binning on the value itself, through a "Group by range" transform. The "Others" collector may be added, and low and high out-of-range values may be distinguished.

Where a number of bins is limited, the user may define multiple "Group by range" dimensions in order to apply filters having an impact on the min/max values. Logarithmic-scale binning is possible but may involve creation of an intermediate calculated dimension (which can be hidden).

Another of the data manipulation types listed above, is categorization. The categorization transformation maps source values into a small set of meaningful categories, turning the source variable into a categorical variable. For instance, a flight arrival delay could be categorized as:

early (delay<0)
on-time (delay>=0 & delay<5 mn)
late (delay>=5 mn & delay<30 mn)
very late (delay>=30 mn & delay<3 h)
compensation-entitling (delay>=3 h)

For a SQL data source, categorization can be expressed using a CASE expression.

For categorization, LUMIRA provides a "Group by selection" in the prepare room. This operates on discrete values (i.e., it allows to transform a large set of discrete values into a smaller set). Categorization of continuous variables can be achieved through a calculated dimension.

Available functions may be constrained by TREX function set. If the concise SQL CASE expression is unavailable, it can be emulated by nested IF THEN ELSE expressions.

Grouping is another type of data manipulation which may be used to produce a wrangled dataset from the sampled data. In particular, once a value has been discretized into a small set of unique values, it can be used as a GROUP BY column in SQL aggregations to reduce the cardinality of the data set. Depending on the characteristics of the SQL engine/optimizer, it might be more efficient to materialize the discrete values into an extra column, prior to aggregation.

It is noted that discretization may be applied early in the calculation plans that produce data visualizations. In some cases, discretization may occur prior to the first aggregation nodes.

However, a decision to discretize a continuous variable/attribute does not have to be made when sampling a large dataset. A random sample can be extracted with untransformed values. Suitable discretization (e.g., rounding, binning, categorization) can then be implemented at the user's discretion when working with the sample. The discretization can then be performed on the server side when pushing computations to the full dataset.

Figure 3D:
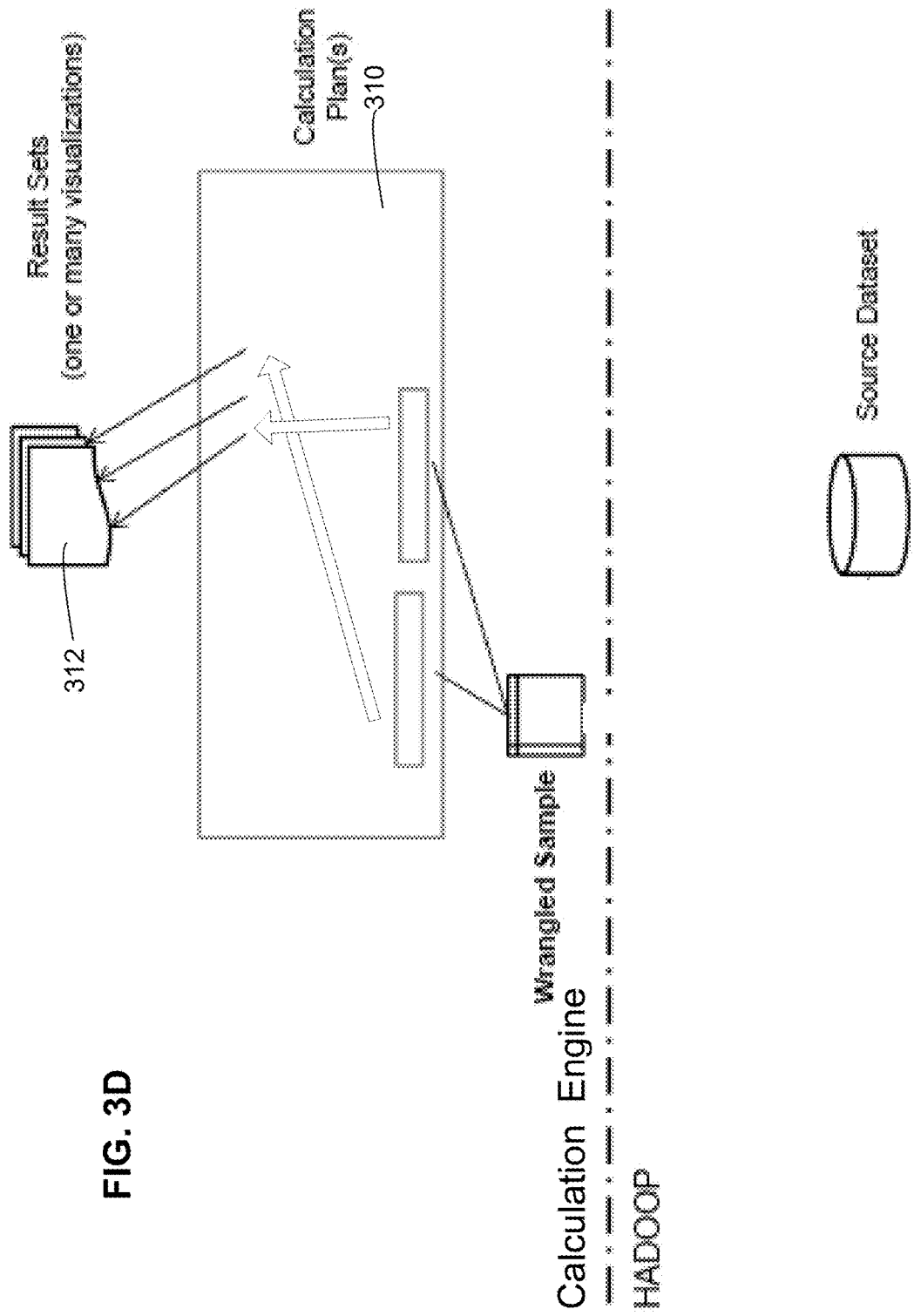

As shown in FIG. 3D, having created a wrangled data sample, via the LUMIRA desktop a user employs the calculation engine to conduct data visualization analysis and/or storytelling. For example, the user may perform time enrichment, geographic enrichment, and data blending, and/or create customer hierarchy workflows. This is done utilizing the calculation plan 310 as described above.

The user may iterate data visualizations 312, change the chart, add filters, and perform other tasks, before ultimately settling on the appropriate visualizations that tell a cogent story for the sampled data.

The aggregation done by the visualization may need to be compensated in order to display to the user a "real number" if it is SUM, COUNT, and AVG as well as their running and moving counterpart. MIN, MAX, and COUNT DISTINCT may not be compensated.

An icon may be provided to explain that the numbers are simulating big data dataset, and that there is an error margin. SORT could be impacted by the error margin if two measures are close enough and RANKING may be used.

FIGS. 3D1 and 3D2 show the results of visualization based upon an initial sampling of a larger data set (here, flights to the ATL, SEA, and STL airports). In particular, FIG. 3D1 shows sampling the flight data on a quarterly basis, and FIG. 3D2 shows sampling the flight data on a monthly basis.

Both of these visualizations of sampled data, reveal two events of interest. One is a major drop in Atlanta's traffic in 1989, resulting from a strike at Eastern Airlines (EA).

Another major traffic drop at Atlanta airport (ATL) occurred in 1991, following the shutdown of Eastern Airlines. Each of these plots demonstrates the potential benefit of using a sampled dataset as an initial starting point for performing visualization and analysis of big data.

The next stage comprises validating and sharing the data of this story. In particular, a user typically wants to see the results on the entire dataset, and then share it with others.

Accordingly, the user selects LUMIRA Team Server—LTS (which embeds the calculation engine), to publish the story with non-sampled dataset. In order to obtain the full data from the dataset, the minimal grouping sets extraction definition can be provided and schedule options defined to HADOOP. By clicking "finish", a job to the LUMIRA Team Server will be scheduled. Other jobs scheduled on the LUMIRA Team Server may be rescheduled.

The wrangled dataset 319 (post wrangling) is generated from the original dataset, and that wrangled dataset is stored in a Parquet within HADOOP.

Figure 3E:
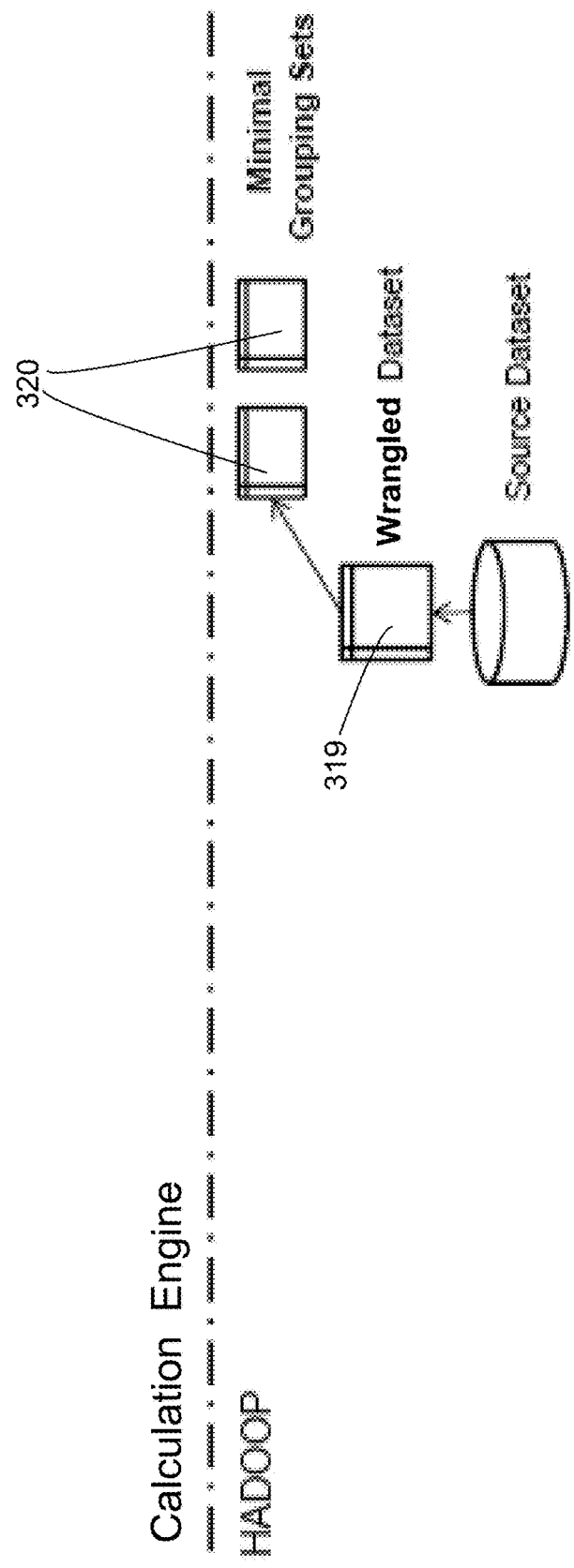

The grouping sets 320 are generated from the wrangled dataset. In particular, HADOOP returns the minimal grouping sets 320 from the full source dataset. The grouping sets are stored in a Parquet in HADOOP. This is also shown in FIG. 3E.

Figure 3F:
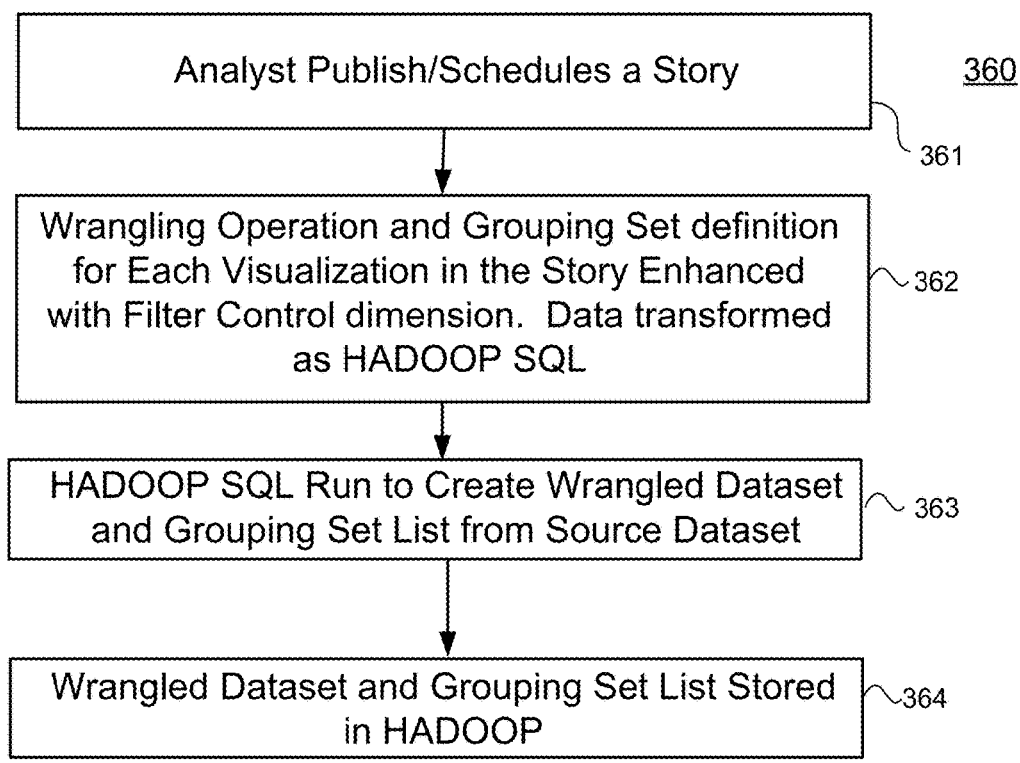

Thus as shown above, based upon these results from the sampled data, a user may publish/schedule a story with the underlying large data volume of the big data layer. FIG. 3F summarizes a simplified process flow 360 according to an embodiment.

In a first step 361, the user publishes/schedules a story. Second step 362 comprises a wrangling operation and grouping set definition for each visualization in the story enhanced with filter control dimension. These are transformed as HADOOP SQL.

In a third step 363, HADOOP SQL is run to create a wrangled dataset and grouping set list from source dataset.

In a fourth step 364, the wrangled dataset and grouping set list are stored in HADOOP.

Next, these returned grouping sets are then communicated to the calculation engine embedded in the LUMIRA layer for processing.

In LUMIRA, the User refreshes the LUMIRA files (LUM) with the sample. If the LUMs have been published previously to LUMIRA Team Server, then LUMIRA desktop goes and gets the grouping sets from HADOOP if they all have been computed. This way, an end user can see in LUMIRA desktop the real data.

If the LUMs have not been published or the scheduled job has not finished, then the system queries for a new sample. This is similar to the initial acquisition phase discussed above.

Figure 3G:
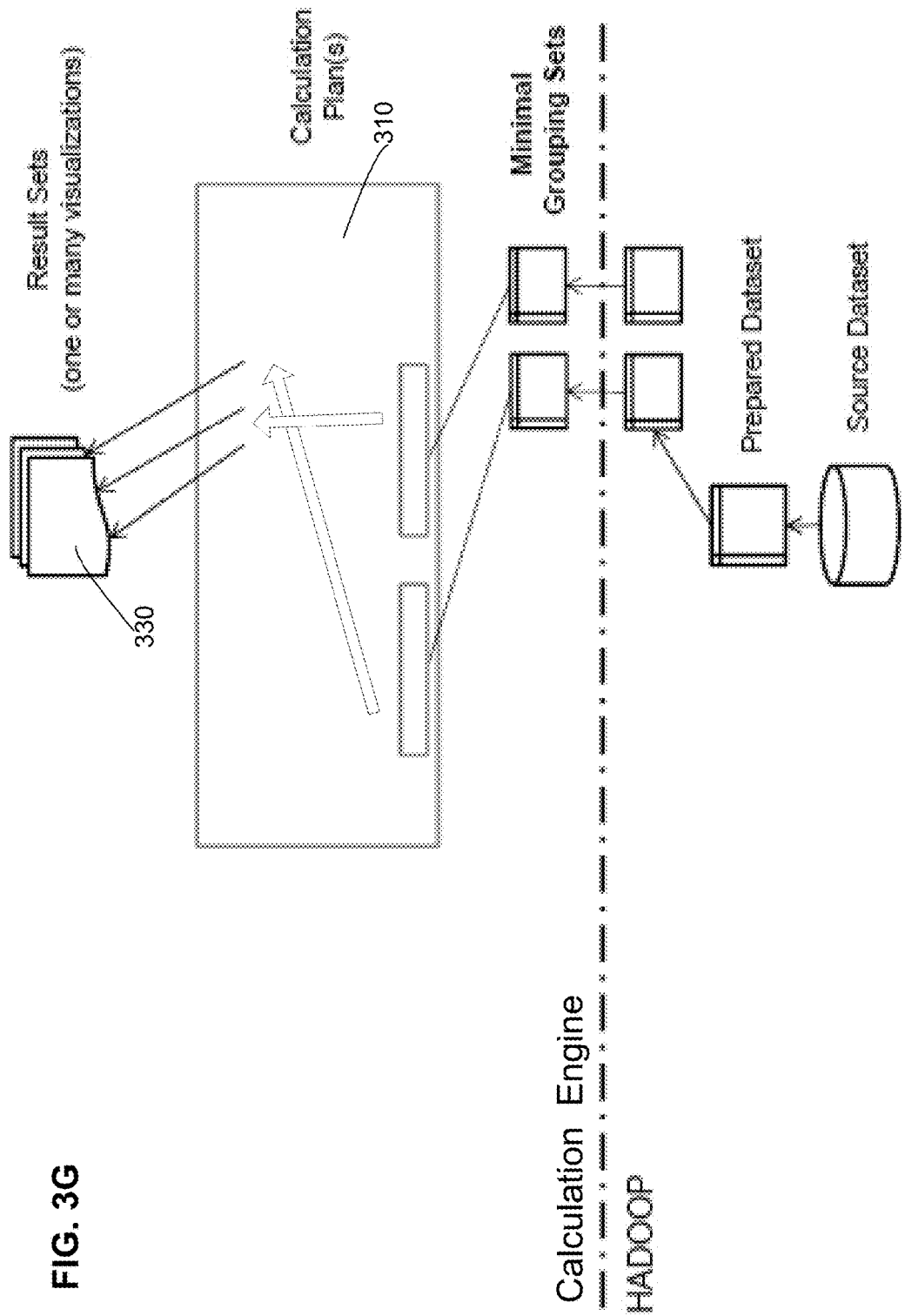

As shown in FIG. 3G, the calculation engine performs the initial and detailed operations according to the calculation plan. The visualizations 330 resulting from processing of the grouping sets produced by the calculation plan are then ultimately provided from the calculation engine to the user, via the LUMIRA interface.

FIG. 3G1 shows an example visualization of the full dataset of the flight information to the airports. This visualization shows with enhanced granularity, the nature of the two events (1989 strike, 1991 shutdown).

Specifically, in the LUMIRA Team Server, a user opens a LUM published and scheduled. The LUMIRA Team Server (LTS) opens the LUM file. This transparently triggers the loading of the grouping sets stored in the LUM file during scheduling into calculation engine, and then calculates all related visualizations.

If the user refreshes the document, then LTS goes and fetches the latest grouping sets stored in HADOOP to update the one in the LUM files. If the user goes out of scope, he or she is user is warned about the necessary delay for computation to decide whether or not to go online, or on sampling. New transient grouping sets may be queried from a datasource from which data has been wrangled. A calculation is performed on the SAMPLED Dataset stored in the LUM file.

Figure 3H:
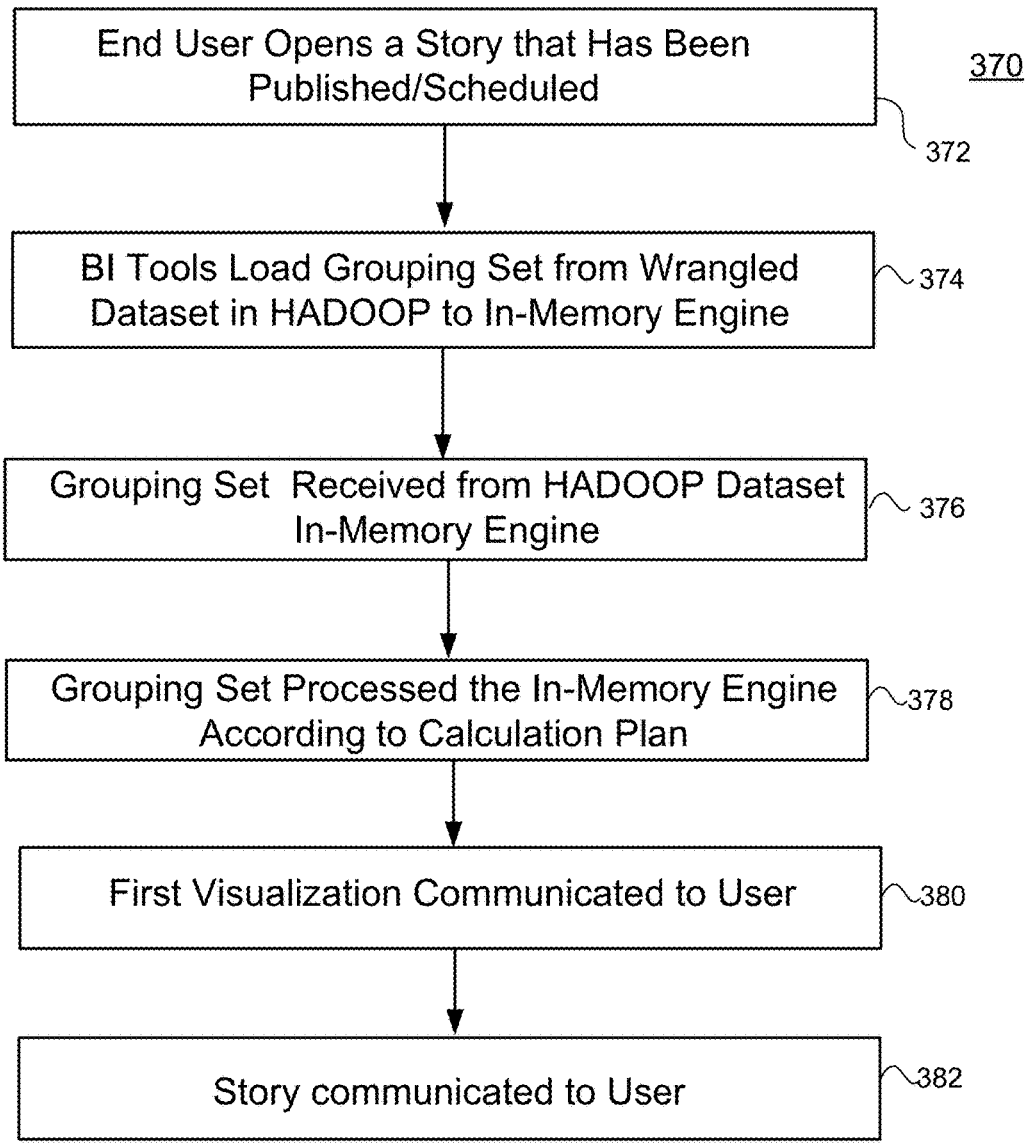

FIG. 3H is a simplified flow diagram illustrating a process 370 for an end-user to retrieve data and view a story on a full (rather than sampled) HADOOP dataset. In a first step 372 an end user opens a story that has been published/scheduled.

In a second step 374, Business Intelligence (BI) tools load grouping set from wrangled dataset in HADOOP, to an in-memory database engine.

In a third step 376 the grouping set is received from HADOOP dataset by the in-memory database engine.

In a fourth step 378 the grouping set is processed the in-memory engine according to the calculation plan.

In a fifth step 380 the first visualization is communicated to a user. Further visualizations based upon the calculation plan/grouping set(s) may also be communicated to a user.

In a sixth step 382 the story is communicated to a user.

Figure 4:
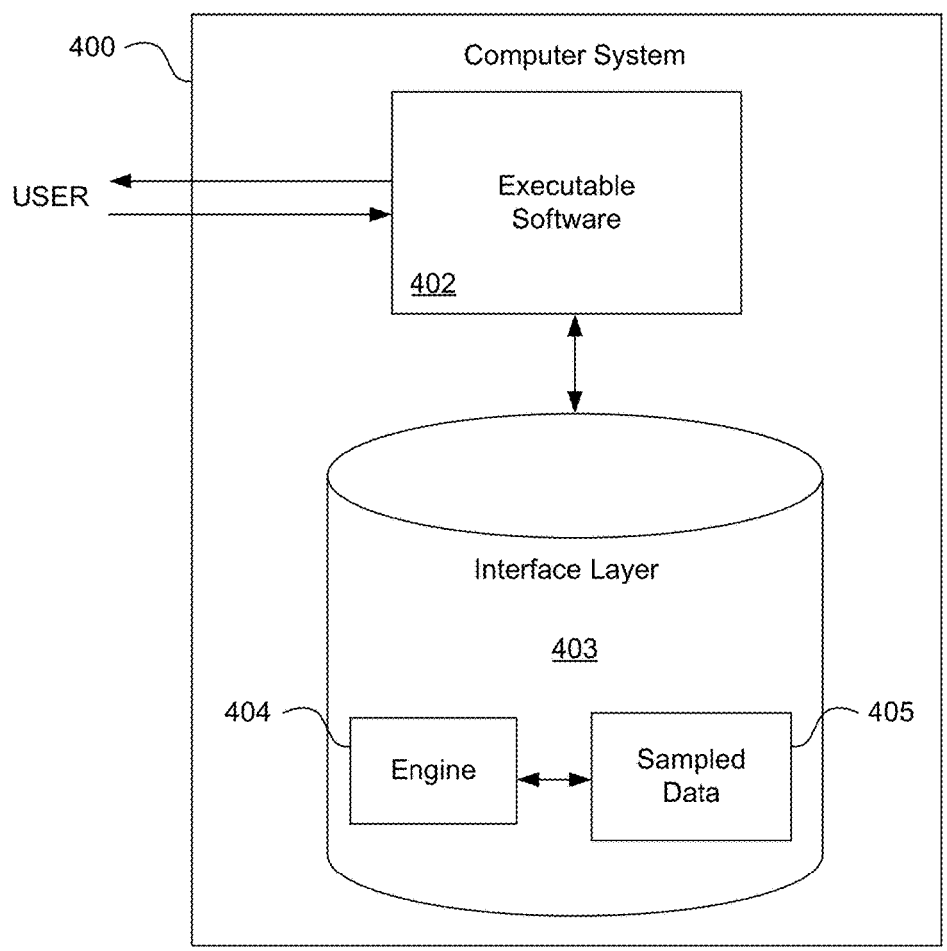
FIG. 4 illustrates hardware of a special purpose computing machine configured to implement visualization of large data volumes according to an embodiment.

FIG. 4 illustrates hardware of a special purpose computing machine configured to perform visualization search and highlighting according to an embodiment. In particular, computer system 400 comprises a processor 402 that is in electronic communication with a non-transitory computer-readable storage medium 403 of an interface layer. This computer-readable storage medium has stored thereon code 405 corresponding to a dataset sampled from a much larger dataset according to user instructions. Code 404 corresponds to an in-memory database engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   a first, in-memory database engine of an interface layer comprising an in-memory database, communicating with a separate layer comprising a large volume of stored data, to receive a first dataset representing a sample of the large volume of stored data, wherein the sample is prepared from a SUM aggregation operation or a COUNT aggregation operation leveraging an existing functionality in the separate layer, wherein communicating the first dataset comprises:
   the first, in-memory database engine receiving the sample from the separate layer; and
   the first, in-memory database engine refining the sample to provide the first dataset, wherein the refining comprises binning;
   the first, in-memory database engine storing the first dataset in the in-memory database;
   the first, in-memory database engine creating from the first dataset, a multi-stage calculation plan configured to receive a minimal grouping set as input;
   a second engine executing a SQL operation comprising Rank, on the first dataset according to the calculation plan to produce a first result set;
   the second engine receiving from the separate layer, a second dataset comprising the minimal grouping set;
   the second engine performing a SORT SQL operation on the second dataset according to the calculation plan to produce a second result set; and
   the first, in-memory database engine creating a visualization from the second result set, the visualization including an icon explaining that the second result set simulates the large volume of stored data, and explaining that there is an error margin in the second result set.

2. A method as in claim 1 wherein the second dataset is further prepared from a filter operation performed in the separate layer.

3. A method as in claim 1 wherein the calculation plan is defined by desired dimensions and measures indicating a trend in the large volume of stored data.

4. A method as in claim 1 wherein the sample comprises a random sample.

5. A method as in claim 1 wherein the second dataset is produced by refining performed in the separate layer.

6. A non-transitory computer readable storage medium embodying a computer program for performing a method, said method comprising:
   a first, in-memory database engine of an interface layer comprising an in-memory database communicating with a separate layer comprising a large volume of stored data, to receive a first dataset representing a sample of the large volume of stored data, wherein the sample is prepared from a SUM aggregation operation or a COUNT aggregation operation leveraging an existing functionality in the separate layer, wherein communicating the first dataset comprises:
   the first, in-memory database engine receiving the sample from the separate layer; and
   the first, in-memory database engine refining the sample to provide the first dataset, wherein the refining comprises binning;
   the first, in-memory database engine storing the first dataset in the in-memory database;
   the first, in-memory database engine creating from the first dataset, a multi-stage calculation plan configured to receive a minimal grouping set as input;
   a second engine executing a SQL operation comprising Rank, on the first dataset according to the calculation plan to produce a first result set;
   the second engine receiving from the separate layer, a second dataset comprising the minimal grouping set;
   the second engine performing a SORT SQL operation on the second dataset according to the calculation plan to produce a second result set; and
   the first, in-memory database engine creating a visualization from the second result set, the visualization including an icon explaining that the second result set simulates the large volume of stored data, and explaining that there is an error margin in the second result set.

7. A non-transitory computer readable storage medium as in claim 6 wherein the calculation plan is defined by desired dimensions and measures indicating a trend in the large volume of stored data.

8. A computer system comprising:
one or more processors;
a software program, executable on said computer system, the software program configured to:
cause a first, in-memory database engine of an interface layer comprising an in-memory database communicating with a separate layer comprising a large volume of stored data, to receive a first dataset representing a sample of the large volume of stored data, wherein the sample is prepared from a SUM aggregation operation or a COUNT aggregation operation leveraging an existing functionality in the separate layer, wherein the first dataset is produced by refining comprising binning;
cause the first, in-memory database engine to create from the first dataset, a multi- stage calculation plan configured to receive a minimal grouping set as input;
cause a second engine to execute a SQL operation comprising Rank, on the first dataset according to the calculation plan to produce a first result set;
cause the second engine to receive from the separate layer, a second dataset comprising the minimal grouping set;
cause the second engine to perform a SORT SQL operation on the second dataset according to the calculation plan to produce a second result set; and
cause the first, in-memory database engine to create a visualization from the second result set, the visualization including an icon explaining that the second result set simulates the large volume of stored data, and explaining that there is an error margin in the second result set.

9. A computer system as in claim 8 wherein the second dataset is further prepared from a filter operation performed in the separate layer.

10. A computer system as in claim 8 wherein the calculation plan is defined by desired dimensions and measures indicating a trend in the large volume of stored data.

11. A computer system as in claim 8 wherein the sample comprises a random sample.

\* \* \* \* \*